Figure 1:
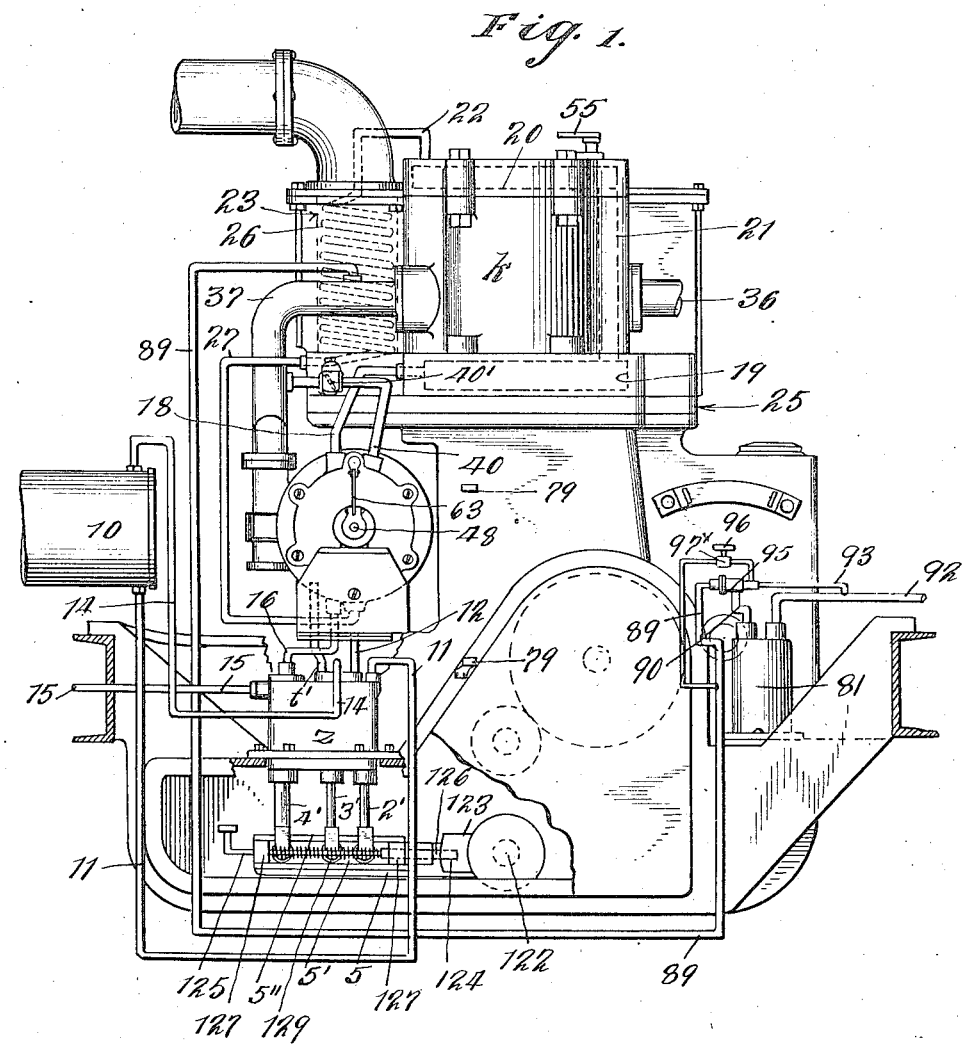

O. KRAUS.
APPARATUS FOR THE PRODUCTION AND UTILIZATION OF WORKING FLUIDS.
APPLICATION FILED JULY 8, 1913.

1,151,366.

Patented Aug. 24, 1915.
8 SHEETS—SHEET 1.

Witnesses:
M. Hamilton.
M. Reimer.

Otto Kraus Inventor
By his Attorney
James Hamilton

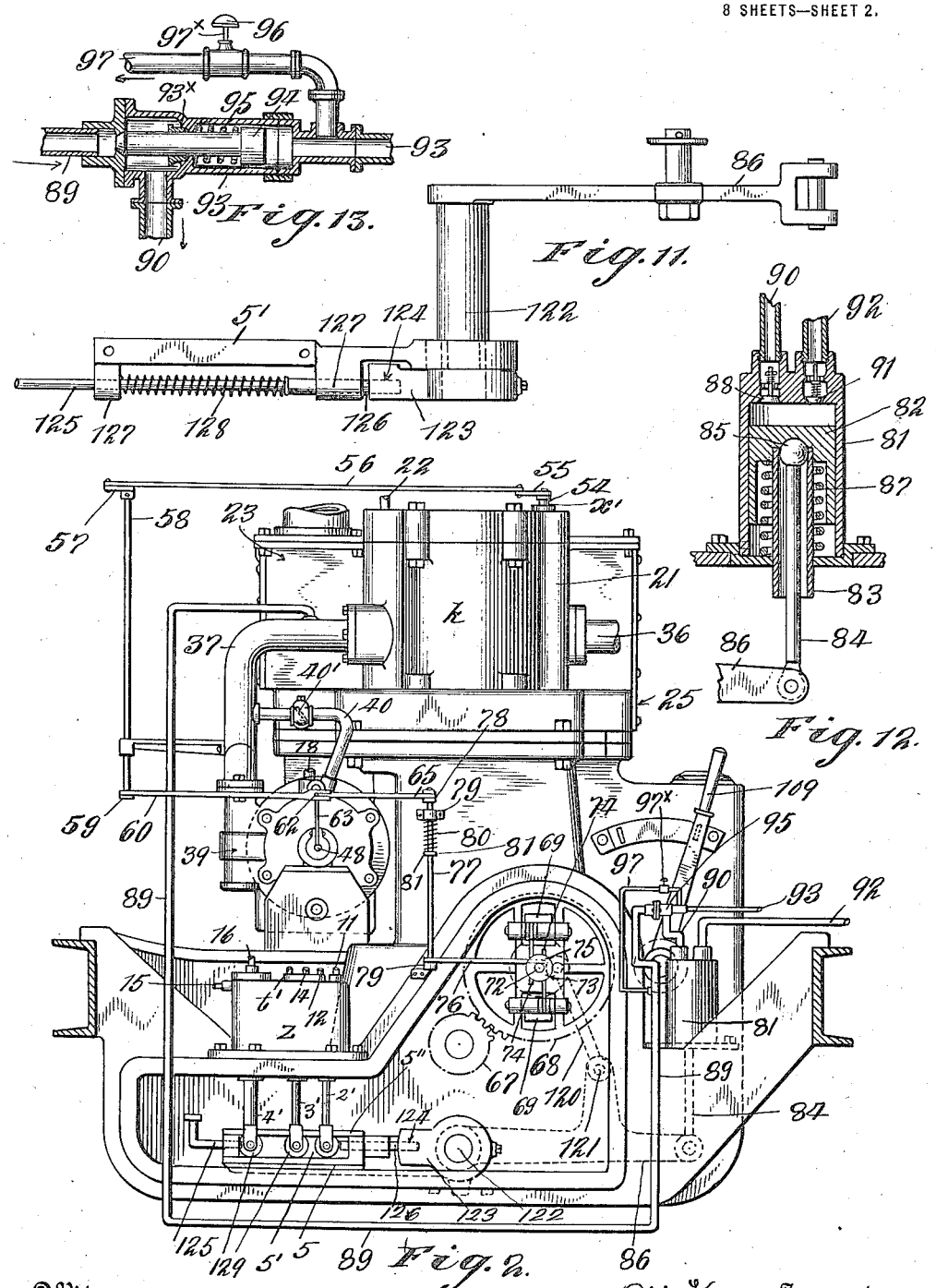

O. KRAUS.
APPARATUS FOR THE PRODUCTION AND UTILIZATION OF WORKING FLUIDS.
APPLICATION FILED JULY 8, 1913.
1,151,366.
Patented Aug. 24, 1915.
8 SHEETS—SHEET 3.
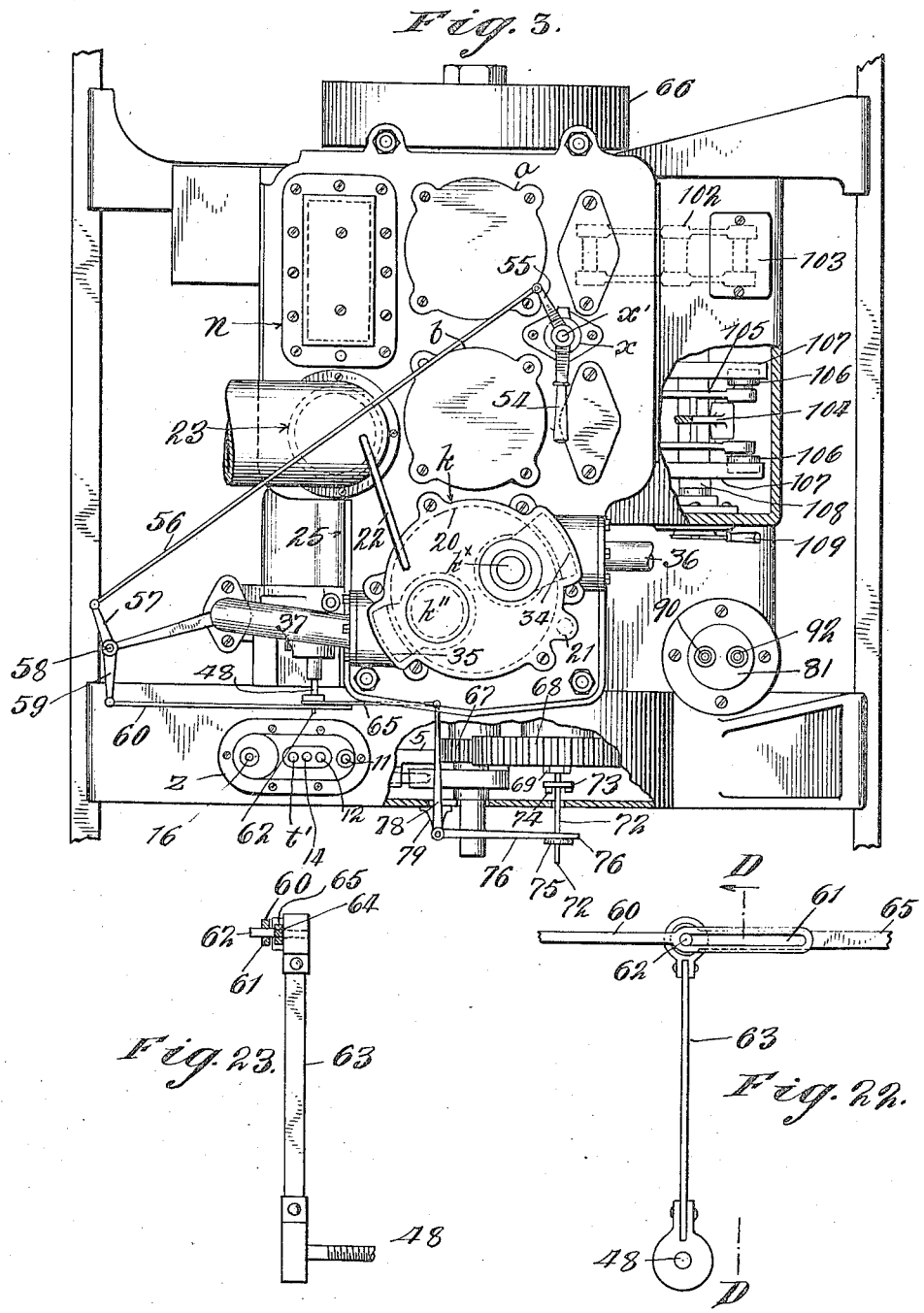

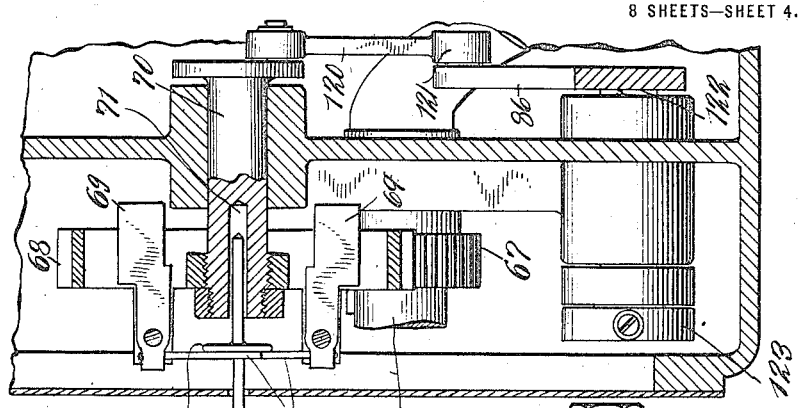

O. KRAUS.
APPARATUS FOR THE PRODUCTION AND UTILIZATION OF WORKING FLUIDS.
APPLICATION FILED JULY 8, 1913.
1,151,366.
Patented Aug. 24, 1915.
8 SHEETS—SHEET 5.
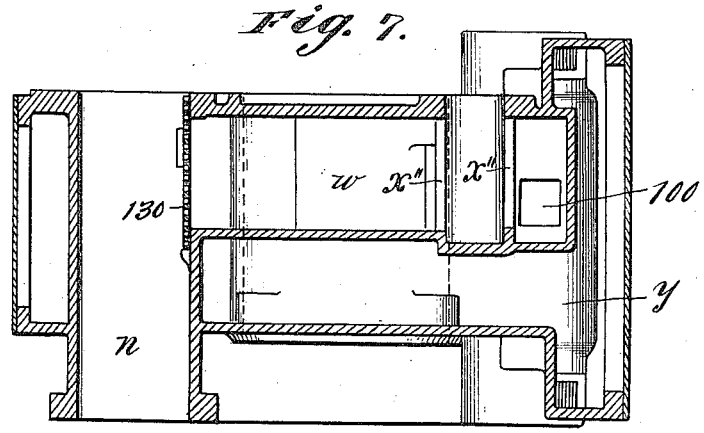
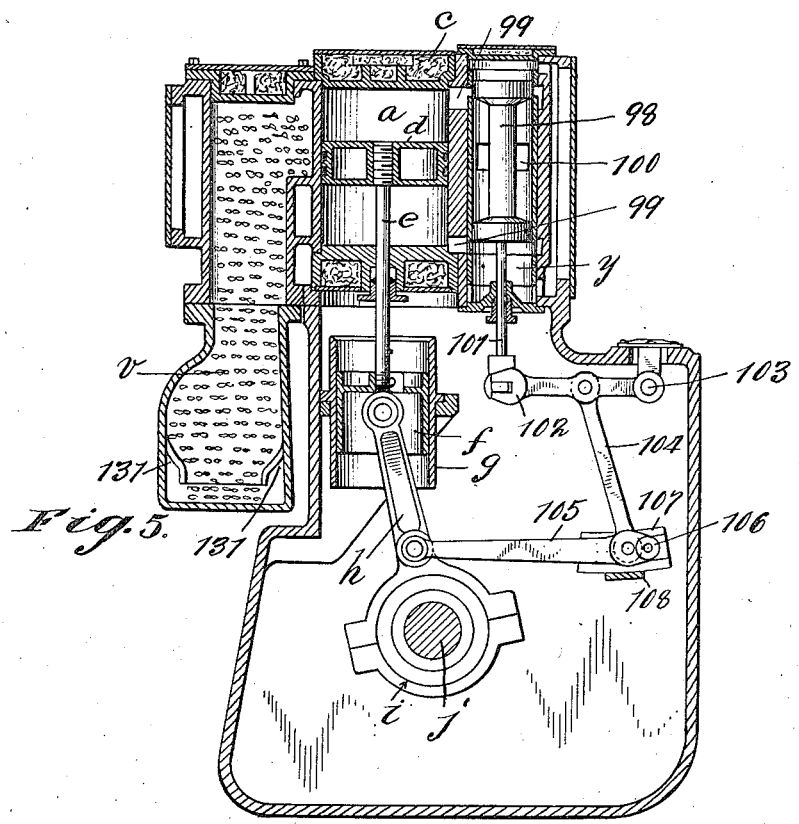

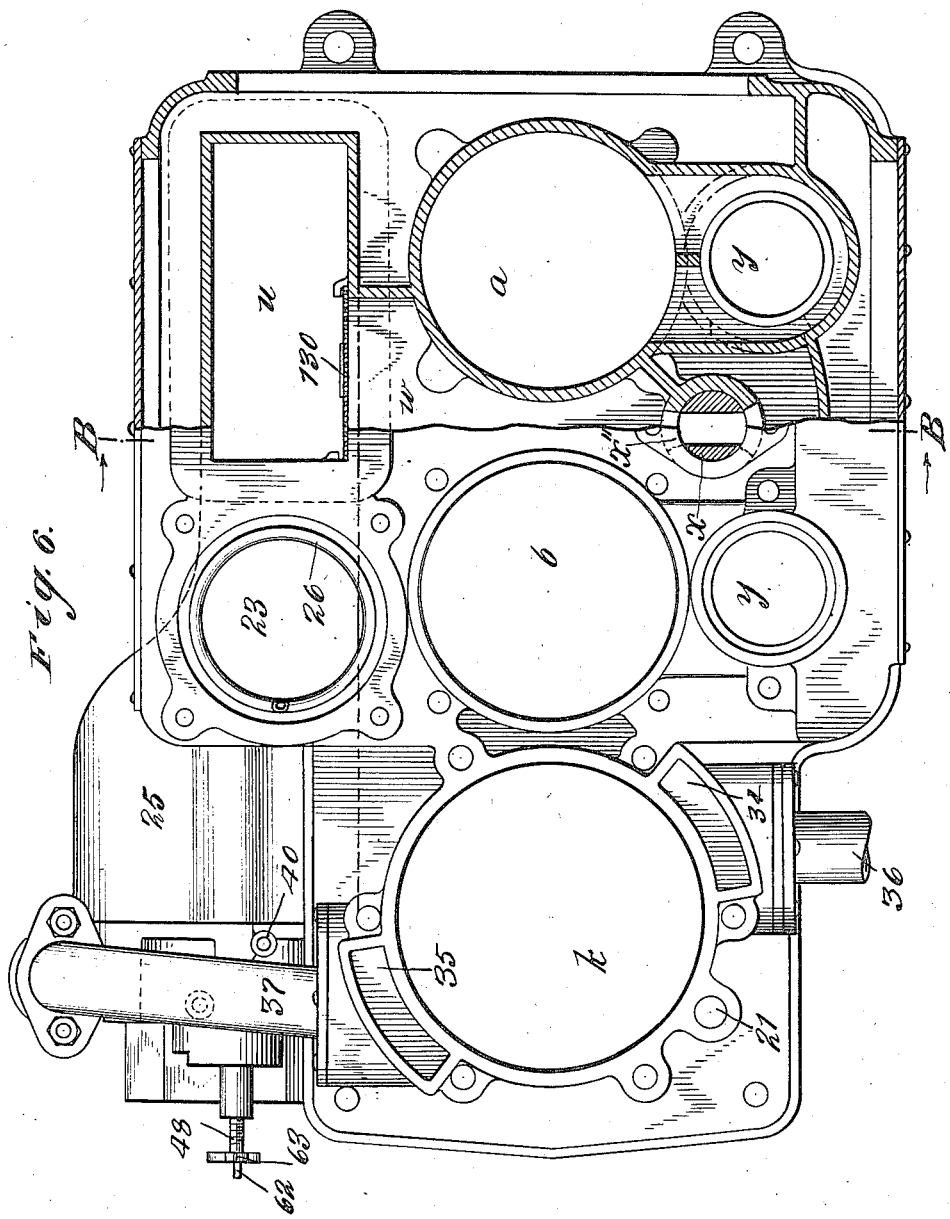

O. KRAUS.
APPARATUS FOR THE PRODUCTION AND UTILIZATION OF WORKING FLUIDS.
APPLICATION FILED JULY 8, 1913.
1,151,366.
Patented Aug. 24, 1915.
8 SHEETS—SHEET 7.
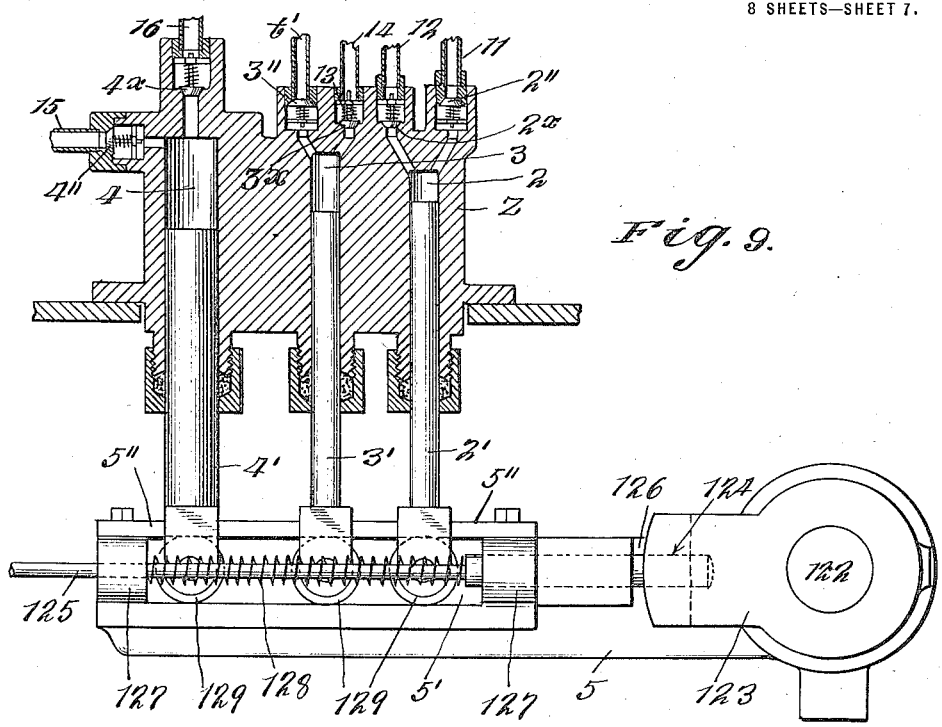
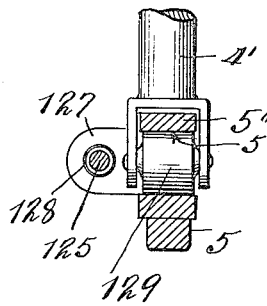
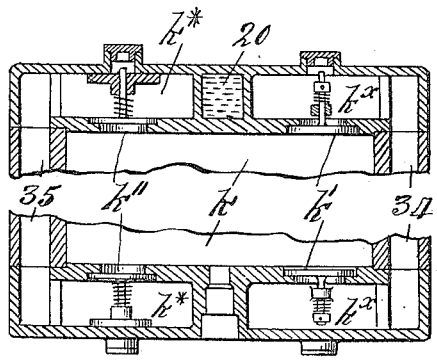
Witnesses:
M. Hamilton.
M. Reimer.
Otto Kraus Inventor
By his Attorney
James Hamilton

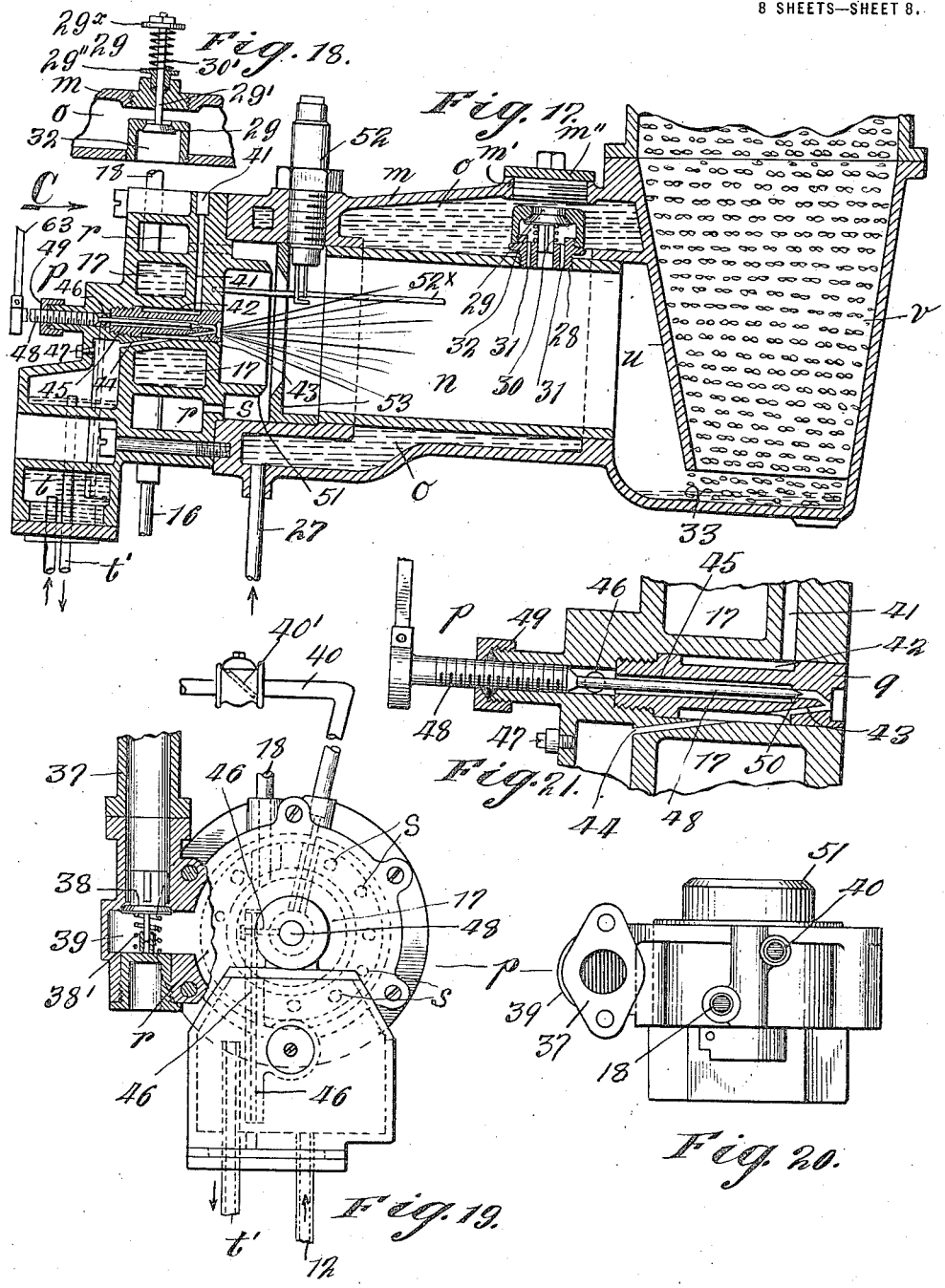

UNITED STATES PATENT OFFICE.

OTTO KRAUS, OF NEW YORK, N. Y., ASSIGNOR TO KRAUS ENGINE COMPANY, OF NEW YORK, N. Y., A CORPORATION OF NEW YORK.

APPARATUS FOR THE PRODUCTION AND UTILIZATION OF WORKING FLUIDS.

1,151,366.   Specification of Letters Patent.   Patented Aug. 24, 1915.

Application filed July 8, 1913. Serial No. 777,869.

*To all whom it may concern:*

Be it known that I, OTTO KRAUS, a citizen of the United States of America, residing at the borough of Manhattan, in the city, county, and State of New York, have invented certain new and useful Improvements in Apparatus for the Production and Utilization of Working Fluids, of which the following is a specification, reference being had to the accompanying drawings.

This invention relates to improvements in methods of and apparatus for the production and utilization of working fluids; and an object of this invention is to increase the efficiency of such methods and apparatus and to simplify and cheapen the construction of the apparatus by the employment of certain novel and peculiar features which will be more particularly referred to hereinafter.

One feature of this invention resides in the path given to the water, which path is so selected and arranged as to cause the water effectively to cool parts which it is desirable to keep in that condition and as subsequently to preheat the water and thereby to effect an economy in fuel. Thus, the water is made to bathe the spraying-nozzle, the walls of the air-chamber in the oil-atomizing apparatus and the cylinder-heads of the air-compressor; and then it is led through the exhaust chamber and thus is made to absorb at least a part of the heat which would otherwise be carried off by the waste gases. The water-jacket around the spraying-nozzle is kept separate from the water-jacket surrounding the combustion chamber in the furnace, whereby the water in its most effective cooling condition is brought into contact with the atomizing apparatus, while in its most highly heated condition it is in a position to be fed directly to the combustion chamber.

Another feature of this invention lies in the provision of means for avoiding the disturbing effects due to ebullition in the water-jacket surrounding the combustion chamber. Communication between the latter and its water-jacket is controlled by a loaded valve which opens only after the pressure in the water-jacket is higher than that of steam at the temperature normally attained by the water in the water-jacket under ordinary working conditions. This pressure is higher than that existing normally in the combustion chamber. The result is that the water, after passing the valve, will in part at least under normal conditions be transferred into steam at the lower pressure existing in the combustion chamber, while ebullition in the water-jacket with its serious disturbing effects upon the regularity of feed of the water to the combustion chamber where it is mixed with the products of combustion, is avoided. In order to prevent the flow of water toward the burner in the oil-atomizing apparatus, the rear end of the combustion chamber (or that end thereof which is the more removed from the burner) is at a lower level than the front end (or the end adjacent to the burner) from which it results that the combustion-chamber is inclined downwardly toward the steam-generator, into a trap at the bottom of which the surplus or excess water flows and collects in a pool.

A third feature of this invention resides in the arrangement of the air-chambers and air-passages through which the air flows after leaving the air-compressor. In the oil-atomizing apparatus there is formed an annular air-chamber between which and the spraying nozzle there is interposed a water-jacket. The result of this arrangement is that the air is cooled by the water in the water-jacket, thereby increasing somewhat the efficiency of operation. The air-passage leading to the oil-well is in prolongation or in line with the air-passage which leads to the outlet end of the spraying-nozzle; and from this arrangement it follows that these air-passages may be simultaneously cleaned and freed of deposit which may have accumulated therein. Provision is made for preventing the premature commingling of the air from the annular air-chamber just referred to with the combustible mixture of oil and air issuing from the spraying-nozzle. By means of a deflector the air from this annular air-chamber is directed inwardly at an appropriate point toward the combustible mixture flowing as a jet from the atomizer. The spark-igniter is so arranged that it will be in the path of the current of air from the annular air-chamber, so as to prevent the formation of a deposit or coating upon the points of the igniter and will normally be maintained at a temperature sufficiently high to insure the burning off of any deposit of soot which may collect thereon.

A fourth feature of this invention resides in the provision of means for maintaining a reserve supply of air at a high pressure by two-stage air-compression. An auxiliary high-pressure air-pump is connected with the compressed-air main and pumps air into a high-pressure air-tank in which the air may be permitted to flow back to the power cylinders at starting, if desired, or in case of an emergency in which there is a demand for more power than the engine at the time can furnish unaided. This reserve supply of high-pressure air will normally be sufficient to drive the engine for some time without aid of combustion. By means of a suitable automatic cut-out the auxiliary high-pressure air-pump is cut out of operation when a predetermined pressure is reached in the high-pressure air-reservoir.

A fifth feature of this invention resides in the means provided for the control of the feed of the fuel (such as a suitable hydrocarbon). By means of governor mechanism the supply of fuel is regulated automatically in accordance with the speed of the engine, which speed determines the volume of air pumped by the air-compressor per unit of time. In addition to controlling automatically the supply of fuel by the governor mechanism, provision is made for controlling the same to a certain extent by means of the throttle-valve past which the working fluid flows to the valve-chambers of the power cylinders. However, the parts are so arranged that the throttle-valve may be fully opened without opening more than to the slight extent needed at starting the valve controlling the supply of fuel, leaving to the governor the further opening of the fuel-controlling valve as the speed of the engine increases and the volume of air pumped by the air-compressor becomes greater. Such an arrangement is desirable, for example, at starting, so that the operator may open the throttle without causing an excessive flow of oil. The arrangement is, however, such that the closing of the throttle-valve may independently of the governor mechanism close the valve controlling the supply of fuel. An example of the desirability of such an arrangement is found where the engine after working under a heavy load with the throttle wide open works under a light load or no load with increasing speed; in this case the operator may close the throttle-valve and at the same time shut off the supply of fuel which under the assumed conditions of a light load or no load is not needed.

Other features of this invention reside in arrangement of the engine parts, such as the proportioning of the combined effective volume of the power cylinders with respect to the volume of the air-compressors, which volumes are arranged for the most efficient operation of the apparatus as a whole; the positioning of the cranks, the cranks of the power-cylinders being set at ninety degrees (90°) apart and the crank of the air-compressor being set at one hundred and eighty degrees (180°) from the crank of one of the power-cylinders; and the mounting of the driving wheel, which is fastened upon that end of the crank-shaft which is the further removed from the air-compressor, whereby the resistances are brought close to the source of power and undue torsional stresses upon the crank-shaft are avoided. For convenience in assembling the several ball-bearings between the connecting-rods and the crank-shaft, they are made of sufficiently great diameter to allow of the ball-bearings being passed over the various bends in the crank-shaft; and the space between the ball-bearing and the crank-shaft is filled by a suitable split or two-part bushing provided with positioning means, whereby ball-bearings of the same standard diameter may be used. Means are provided for lessening the cost of the construction and procuring efficiency of operation. Thus, the engine-casing is made in a single piece or casting; and in this casting are a portion of the steam-generator, the passage from the latter to the valve-chambers of the power-cylinders and the exhaust-chamber into which flow the waste gases from the power-cylinders. The pump mechanism and the auxiliary high-pressure air-pump are driven from the governor shaft; and the capacity of the oil-overflow pump is made sufficiently great to insure the return of all overflow-oil under any condition of operation.

In the drawings illustrating the principle of this invention and the best mode now known to me of applying that principle, Figure 1 is a front elevation of my new apparatus, the front coverplate being broken partly away; Fig. 2 is a front elevation of my new apparatus with the entire front coverplate shown removed to give a view of the governor connection ; Fig. 3 is a plan view; Fig. 4 is a longitudinal section through the center of the cylinders; Fig. 5 is a section on the line A—A of Fig. 4; Fig. 6 is a plan of the engine-casing, partly in section, the cylinder-heads, pistons, valves and other parts being omitted for sake of clearness; Fig. 7 is a section on the line B—B of Fig. 6; Fig. 8 is a detail showing the governor mechanism and the pump-actuating mechanism; Fig. 9 is a detail in central vertical section of the water-pump and the oil-pumps; Fig. 10 is a detail showing the connection between the pump-plungers and the pump-lever; Fig. 11 is a detail showing the pump-actuating mechanism: Fig. 12 is a detail in section of the auxiliary high-pressure air-pump: Fig. 13 is a detail of the device for cutting out the auxiliary high-pressure air-pump: Fig. 14 is a detail showing in vertical central section the top cylinder-head of the air-compressor; Fig. 15 is a detail showing in vertical central section the bottom cylinder-head of the air-compressor; Fig. 16 is a detail showing the manner in which the ball bearings are mounted on the crank-shaft: Fig. 17 is a detail showing in longitudinal vertical section the furnace, together with the parts directly attached thereto; Fig. 18 is a detail showing a modified form of valve for controlling the flow of water from the water-jacket to the combustion-chamber: Fig. 19 is a view, partly in section, of the atomizing apparatus, the view being taken in the direction of the arrow C of Fig. 17; Fig. 20 is a detail showing in plan the atomizing apparatus illustrated in Figs. 19 and 20; Fig. 21 is a detail showing in central vertical section the valve which controls the fuel-supply; Fig. 22 is a detail of the flexible valve-controlling arm and its attached parts; and Fig. 23 is a section on the line D—D of Fig. 22.

In the particular embodiment of this invention illustrated in the drawings, there is provided a pair of power cylinders $a$, $b$, the ends of which are chambered and filled with lagging $c$ (Fig. 4); and in each of these working cylinders there is slidably mounted a piston $d$ screwed upon the inner end of a piston-rod $e$ the outer end of which is screwed into a cross-head $f$ slidably mounted in a cylindrical guide $g$ and pivotally connected with one end of a connecting-rod $h$ the other end of which is connected through a ball-bearing $i$ (Fig. 16) with the bent crank-shaft $j$. Substantially in line with the power cylinders $a$, $b$, there is arranged the cylinder of an air-compressor $k$ within which is slidably mounted a piston $d'$ which is connected with the crank-shaft $j$ in a manner entirely similar to that in which the pistons $d$ of the power cylinders are connected with the crank-shaft. For the generation of the working fluid there is provided a furnace $m$ (Fig. 17) the combustion chamber $n$ of which is formed with a water-jacket $o$ from which there is fed to the combustion-chamber a supply of preheated water in the manner hereinafter described. At the front end of the furnace $m$ there is bolted thereto an oil-atomizing apparatus $p$ (Figs. 17 and 19 to 21) having a water-cooled nozzle $q$ channeled for the passage of a suitable hydrocarbon (such as fuel-oil) and formed with an annular air-chamber $r$ and air-passages $s$ leading therefrom and with a well $t$ for the reception of the fuel-oil. At the rear or outlet end of the furnace $m$ there is arranged a steam-generator $u$ which contains small bits $v$ of a suitable material over the extensive heating surface of which there passes the stream of combustion products carrying entrained moisture. From the upper end of the steam-generator $u$ the working fluid flows through the passage $w$ (Figs. 5 to 7) past the throttle-valve $x$ which controls the power and speed of the engine and passes to the valve-chambers $y$ of the power cylinders $a$, $b$.

The supply system includes a series of three pumps 2, 3, 4 one of which controls the supply of water and the other two of which control the supply of fuel-oil, or other suitable hydrocarbon, (Figs. 1 and 9). For compactness and economy of construction these three pumps have a common casing $z$ and the outer ends of their plungers $2'$, $3'$, $4'$ are connected with a common pump-lever 5 which is constructed and actuated as will be more particularly described hereinafter.

The oil-supply system includes an oil-tank 10 (Fig. 1) from which the oil flows through an oil-pipe 11 to the pump-casing $z$, where it is drawn by the plunger $2'$ of the oil-supply-pump 2 past the admission-valve $2''$; and upon the inward stroke of the plunger $2'$ the oil is forced past the outlet valve $2^{\times}$ into an oil-pipe 12 which conducts the oil into the oil-well $t$ formed in the atomizing apparatus $p$. In this oil-well $t$ the oil is exposed to the pressure of the air furnished by the air-compressor $k$ in a manner hereinafter more particularly described. In order to maintain the oil at a given level in the oil-well $t$, an overflow-pipe $t'$ (Figs. 1 and 19) is provided therein and leads to the pump-casing $z$, where it flows past the admission-valve $3''$ upon the outward stroke of the oil-overflow pump-plunger $3'$. The outlet valve $3^{\times}$ of the oil-overflow pump 3 is loaded (as by a spring 13) so that this valve $3^{\times}$ will not open except upon the application of a pressure greater than that existing in the overflow-pipe $t'$ leading from the oil-well $t$. In this way undue flow of air from the oil-well $t$ is prevented, the oil-overflow pump 3 being formed with sufficient clearance to permit the compression of the air therein without forcing open the spring-loaded valve $3^{\times}$; but the oil which normally overflows from the oil-well $t$ is pumped back into the oil-tank 10 through the oil-return pipe 14 which enters at the top of the latter. In order to make the oil-overflow pump 3 of greater capacity than the oil-supply pump 2, the stroke of the oil-overflow pump-plunger $3'$ is made longer than the stroke of the oil-supply pump-plunger $2'$ (but it will be understood that the capacity of the oil-overflow pump 3 may be made greater in other ways than by increasing the stroke of its plunger $3'$). When the engine is running without the consumption of fuel (as may occur, for example, in the case of the engine of an automobile coasting) all the oil pumped by the oil-supply pump 2 may overflow from the oil-well $t$; and in order to insure that this overflow of oil will be pumped back to the oil-tank 10 and thereby to prevent flooding of the combustion-chamber $n$, the capacity of the oil-overflow pump 3 is made somewhat greater than the capacity of the oil-supply pump 2.

The water-supply system includes the water-pump 4 which upon the outward stroke of its plunger 4' draws water from any suitable source through a water-inlet pipe 15 (Fig. 9) past the inlet-valve 4'' and upon its inward stroke forces the water past the outlet valve 4$^x$ into the water-pipe 16 by which the water is led into the annular water-chamber 17 in the atomizing apparatus $p$ (Fig. 17). This water-chamber 17 encircles the nozzle $q$ of the atomizer, whereby the nozzle is kept water cooled so as to prevent the vaporization of the oil in its passage through the nozzle; and it is to be noted that the water in this instance is pumped into the atomizing apparatus directly from the supply-pipe 15 in order that the water which reaches the latter shall be in its coolest condition and therefore most effective for cooling purposes; but this arrangement may be varied depending upon the initial temperature of the water. From the annular water-chamber 17 in the atomizer $p$ the water flows through the water-pipe 18 into a water-chamber 19 in the bottom cylinder-head of the air-compressor $k$ (Fig. 1). In the top cylinder-head of the latter there is a similar water-chamber 20 and these two water-chambers 19, 20 are connected by a water-passage 21 through which the water flows under pressure from the lower water-chamber 19, to the upper water-chamber 20. From the upper water-chamber 20 the water is led by a water-pipe 22 into the exhaust-chamber 23 of the engine-casing 25 and thence through a coil 26 of piping mounted in this exhaust-chamber 23. The coil 26 acts as a preheating coil within which the water is preheated by the exhaust gases flowing from the engine. The water is led from the coil 26 in the exhaust-chamber 23 by a water-pipe 27 to the bottom of the furnace $m$ (Fig. 17) where it enters the water-jacket $o$ surrounding the combustion-chamber $n$ thereof. In this water-jacket $o$ there is arranged a valve-casing 28 in which is mounted a valve 29 controlled by a spring 30; and the valve-casing 28 is provided with channels 31 which permit communication between the valve-chamber 32 and the combustion-chamber $n$ near the outlet end of the latter. The tension of the spring 30 which controls the valve 29 is so regulated as to maintain the same closed until a given predetermined pressure is reached in the water-jacket $o$, at which pressure the valve 29 will open and admit water into the valve-chamber 32, which water will flow through the channels 31 into the combustion-chamber $n$. The tension of the spring 30 is so regulated that the pressure necessary to open the valve 29 will be greater than the pressure of steam at the temperature reached by the water in the water-jacket $o$ under normal working conditions of the apparatus; therefore, normally steam will not be formed in the water-jacket $o$, but as soon as the water passes the valve 29 and encounters the lower pressure in the valve-chamber 32, it will be transformed at least partially into steam by reason of the latent heat which it normally will contain and because of the lower pressure to which it is subjected within the valve-chamber 32 (and the combustion-chamber $n$ which is in communication therewith); that is, immediately after the water passes the valve 29, at least a part of it will expand into steam at this lower pressure existing in the combustion-chamber $n$. As is shown in Fig. 17 the combustion-chamber $n$ is inclined downwardly toward the rear, so that any surplus or excess water will collect in a pool in the trap 33 formed in the bottom of the steam-generator $u$. In the casing of the furnace $m$ there is formed a handhole $m'$ (Fig. 17) which is closed by a cover or plug $m''$ by removing which access may be obtained to the valve 29 for removal, replacement or repair of the same. In case it be desired to have the valve accessible from the outside of the furnace, the construction shown in Fig. 18 may be used, in which the valve-stem 29' extends outside of the furnace-casing through the stuffing-box 29'' between which and the collar 29$^x$ on the upper end of the stem 29' there is interposed a coil-spring 30' the function of which corresponds to that of the coil-spring 30 shown in Fig. 17.

The air compressor $k$ (Fig. 4) is double acting and is provided with a set of admission and outlet valves $k'$, $k''$ in each of its cylinder-heads. As shown in Figs. 14 and 15 the inlet or admission valves $k'$ are on the right and the outlet valves $k''$ are on the left. The valve-chambers $k^x$ of the admission-valves $k$ are in communication with each other by an air-passage 34 and the valve-chambers $k^*$ of the outlet valves $k''$ are similarly in communication through an air-passage 35. The air-inlet main 36 communicates with the inlet valve-chambers $k^x$ through this air-passage 34; and a compressed-air main 37 leads from the air-passage 35 connecting the two outlet valve-chambers $k^*$. As shown in Figs. 1 and 19 the compressed-air main 37 at its lower end leads to the atomizing apparatus $p$; and there is arranged in this lower end a spring-loaded valve 38 which controls the passage of the compressed-air from the main 37 to the passage 39 which communicates with the annular air-chamber $r$ formed in the atomizing apparatus $p$. Above this spring-loaded valve 38 there branches from the compressed-air main 37 an air-pipe 40 which leads compressed air past a removable air-screen (shown conventionally at 40') into the air-passage 41 which is formed in the casing of the atomizing apparatus $p$ and which communicates at its inner end with the annular recess or chamber 42 surrounding the nozzle $q$ and with air-passages 43, 44 leading therefrom to the outlet end of the nozzle $q$ and to the oil-well $t$, respectively, from which it results that the oil in the latter is subjected to the pressure which exists in the compressed-air main 37 (Figs. 17 and 21).

The atomizer-nozzle $q$ is provided with a central oil-passage 45 which at its front end communicates with an oil-passage 46 which leads from the oil-well and through which the oil flows to the atomizer-nozzle $q$. At its rear or inner end the oil-passage 45 inclines downwardly to meet the inner end of the air-passage 43 which is inclined upwardly and which lies in prolongation of the air-passage 44. This air-passage 44 connects the annular air-chamber 42 surrounding the nozzle $q$ with the oil-well $t$. By removing a screw-plug 47 a suitable cleaning device may be thrust into the air-passages 44, 43 for the purpose of removing from the same and the air-outlet of the atomizer-nozzle $q$ any deposit which may accumulate therein. In the central oil-passage 45 of the atomizer-nozzle there is mounted a needle-valve 48 which is screwed into a stuffing-box 49 formed on the casing of the atomizer $p$ so that by turning the needle-valve 48 the position of its inner pointed end 50 may be changed to control the flow of oil from the nozzle $q$.

From the annular air-chamber $r$ in the casing of the atomizing apparatus there lead several air-holes or air-passages $s$ which are horizontally-disposed and arranged upon the circumference of a circle having its center at the outlet from the atomizer-nozzle $q$. Since in order that air may pass from the compressed-air main 37 to the annular air-chamber $r$ the tension of the spring 38' controlling the valve 38 in the compressed-air main 37 must be overcome, it follows that when air is supplied to the combustion-chamber $n$ from the annular air-chamber $r$, air will certainly be supplied to the oil-well $t$ and to the spraying-nozzle $q$ of the atomizer $p$; for, the air will, of course, take the line of least resistance and will surely flow through the branch pipe 40, if its pressure is sufficient to open the spring-loaded valve 38 and flow into the annular air-chamber $r$ and thence through the circular series of holes $s$ into the combustion-chamber $n$. Projecting from the rear or inner face of the casing of the atomizing apparatus $p$ is a cylindrical flange 51 which is substantially coaxial with the needle-valve 48 just described. The circular series of air-passages $s$ hereinbefore referred to lie outside of and surround this circular flange 51, between which and the electric-igniter or sparker 52 there is arranged an air-deflecting ring 53 by means of which air issuing from the air-holes $s$ will be directed inwardly toward the spray issuing from the outlet end of the atomizer-nozzle $p$.

As already stated the power and speed of the engine may be manually controlled by a throttle-valve $x$ past which the working fluid flows in passing from the upper end of the steam-generator chamber $u$ to the valve-chambers $y$ of the power cylinders $a$, $b$. Upon the valve-stem $x'$ of this throttle-valve there is mounted an operating-handle 54 and a rocker-arm 55, the free end of the latter being connected by a link-rod 56 with a rocker-arm 57 upon the upper end of a vertical rock-shaft 58 (Figs. 2 and 3) the lower end of which carries a rocker-arm 59. To the free end of the last-named rocker-arm there is connected one end of a slide-rod 60 the other end of which is formed with a slot 61 and is thereby adapted to receive a stud 62 which projects from the upper end of a flexible or spring-arm 63 (Figs. 22 and 23) the lower end of which is fastened to the outer end of the needle-valve 48 that controls the flow of oil through the atomizer-nozzle $p$. The stud 62 passes also through an eye or hole 64 in one end of a link-rod 65 actuated by the governor-mechanism, which will now be described. Upon the end of the crank-shaft $j$ opposite from that carrying the driving wheel 66 there is mounted a pinion 67 which meshes with a spur-gear 68 which carries a pair of pivotally-mounted blocks or weights 69 (Figs. 2, 3, 4 and 8). One end of the shaft 70 carrying the spur-gear 68 is formed with a central bore or socket 71 and the other end of this shaft is flanged or headed. Into the socket 71 projects one end of a slide-rod 72 which is formed with a collar 73 against the outer face of which bear the free ends of a pair of inwardly-projecting fingers 74 the other end of each of which is rigidly fastened to one of the blocks 69 at the pivoted end thereof. Against the inner face of a second collar or disk 75 there is pressed the free end of a rocker-arm 76 the other end of which is fastened upon the lower end of a vertical rock-shaft 77 upon the upper end of which is fastened a rocker-arm 78 the free end of which is connected to one end of the link-rod 65 the other end of which is through the stud or pin 62 connected to the flexible valve-controlling arm 63, as has hereinbefore been described. To one of the brackets 79 in which the vertical rock-shaft 77 is mounted there is fastened one end of a coil spring 80 (Fig. 2) the other end of which is fastened to a collar 81 on the rock-shaft 77. This coil-spring 80 tends to maintain the free end of the rocker-arm 76 pressed against the inner face of the disk-like collar 75 on the slide-rod 72 hereinbefore mentioned. It will be obvious that, as the speed of the engine increases, the free ends of the blocks 69 will be thrown outwardly or away from the shaft 70 of the spur-gear 68 and that the pivoted or finger-carrying ends of these blocks will be thrown inwardly and will through the fingers 74 and the collar 73 press the slide-rod 72 to the right in Figs. 2 and 8. This movement of the slide-rod 72 will through the system of links and rocker-arms just described be communicated to the flexible arm 63, whereby the same will be swung so as to cause the needle-valve 48 to be turned in a direction to increase the flow of oil. When the speed of the engine decreases, the coil-spring 80 acting through the vertical rock-shaft 77, the rocker-arm 78, the link-rod 65 and the flexible arm 63 will turn the needle-valve 48 in the opposite direction or so as to close the same; and acting through the rock-shaft 77, the rocker-arm 76 and the collar 75, this same spring 80 will keep the collar 73 against the fingers 74 of the weights 69. The formation of the slot 61 in the end of the slide-rod 60 permits the operator (as at starting) to open the throttle valve $x$ to a certain extent without swinging the flexible arm 63 and, therefore, without varying the position of the needle-valve 48; at the same time, the operator may by swinging the handle 54 in the opposite direction close both the throttle-valve $x$ and the needle-valve 48 and thereby may cut off the supply of oil at the same time as he shuts off the flow of the working fluid to the valve-chambers $y$ of the power cylinders $a$, $b$.

In many contingencies of operation, such as in starting, going uphill or when an excessive load is otherwise thrown upon the engine, it is desirable to have available a reserve supply of compressed air and, for economy of space, preferably at a pressure higher than the pressure existing normally in the compressed-air main 37; and in this apparatus provision is made for storing such a reserve supply of high-pressure air, as follows: A high-pressure air-pump is provided in the cylinder 81 of which works a piston 82 from which depends a tubular guide 83 that extends outside the base of the cylinder 81 and receives a piston-rod or piston-follower 84 the inner end 85 of which is rounded or ball-shaped and the outer end of which is pivotally connected with the beam or rocker-arm 86 at one end thereof (Figs. 2, 11, 12 and 13). The inner end of the piston-rod 84 is not connected with the piston 82 but is arranged to bear against the underside of the same and to work idly in the guide-tube 83, when occasion demands, as when the pump is cut out or made inoperative as hereinafter described. The base of the piston 82 is chambered and receives the upper portion of a coil-spring 87 which surrounds the guide-tube 83 and the lower end of which rests upon the bottom of the cylinder 81. In the top of the latter there is arranged a spring-controlled check-valve 88 past which flows compressed air from the compressed-air main 37 through the air-pipes 89, 90. As the piston-rod 84 moves outwardly, the compressed air presses the piston 82 down against the tension of the coil-spring 87 and, upon the inward stroke of the piston-rod 84, the piston 82 forces the air above it past the outlet valve 91 into the air-pipe 92 leading to the high-pressure air-reservoir (not shown). After the pressure in the latter has attained a certain predetermined limit, the high-pressure air-pump is cut out of operation as follows: In the air-pipe 93 leading from the high-pressure air-reservoir there is arranged a plunger puppet valve 94 which is normally pressed into open position by a coil-spring 95 and which controls the communication between the air-pipe 89 leading from the compressed-air main 37 and the air-pipe 90 leading to the cylinder 81 of the enlarged end or head of the plunger puppet-valve 94 is exposed to the pressure of the air in the air-return pipe 93; and when this pressure has become sufficiently great to overcome the air-pressure acting upon the other (or smaller) end of the valve 94, the tension of the coil-spring 95 and the friction of the stuffing-box 93$^x$, the valve 94 will be forced into closed position (see Fig. 13) and communication between the compressed-air main 37 and the high-pressure air-pump is thereby shut off, whereupon the piston 82 will be maintained by the coil-spring 87 in its raised position and the piston-rod 84 will move idly up and down in the guide-tube 83. In starting or when an emergency arises making it necessary or desirable to use the reserve supply of air in the high-pressure air-tank, the operator presses upon the knob 96 (Fig. 13) and thereby opens the valve 97$^x$ and allows air at the higher pressure to flow through the by-pass 97 around the valve 94 and into the air-pipe 89 and thence back to the power cylinders $a$, $b$. The reserve supply of high-pressure air is sufficiently great to enable the operator to run the engine for a considerable period of time without assistance from the apparatus which generates the working fluid, or from other source of power.

The engine like the air-compressor is double-acting and each of the power cylinders $a$, $b$, is fitted with a valve 98 of the piston type which controls the flow of the working fluid through the admission ports 99 and the exhaust port 100. The piston-valve 98 is controlled by a modified form of the well-known Joy link-motion, which may be described as follows (Figs. 3 and 5): The outer end of the valve-stem 101 is pivotally connected with the free end of a two-armed lever 102 fulcrumed in the engine-casing at 103. By means of a link-bar 104 this two-armed lever 102 is connected with a two-armed link 105 one end of which is pivotally fastened to the connecting-rod $h$ of the engine and the other end of which is provided with rollers 106 that work in curved guides 107. The link-motion is controlled by a shaft 108 which may be turned by means of the reversing lever 109 (Fig. 2), whereby the guides 107 may be tilted and the point of cut-off varied or the engine entirely reversed.

The crank-shaft $j$ is bent at appropriate points to form cranks to which are connected the rods $h$ of the power cylinders and of the air-compressor. In order to avoid any so-called "dead" point, the cranks $j'$, $j''$, of the power cylinders $a$, $b$, respectively, are set at an angle of ninety degrees (90°) to each other; and, for balancing purposes, the crank $j^x$ of the air-compressor $k$ is set at an angle of one hundred and eighty degrees (180°) to the crank $j''$ of the adjacent power cylinder $b$ (Figs. 4 and 5). In order to facilitate the passage of the standard ball-bearing $i$ over the bends in the crank-shaft $j$, the diameter of the ball-bearing is selected sufficiently great to permit of its being readily slipped along the bent crank-shaft. In Fig. 16 there is illustrated in detail the construction of the ball-bearing $i$ and the mode of connection of the rods $h$ with the crank-shaft $j$, whereby the assembling of these several parts is greatly expedited; and, since the same construction is used with respect to each of the three connecting-rods $h$, it will be necessary to describe only one of these connections. Over the crank-shaft $j$ is slipped a two-part or split bushing 110 one end of which is flanged and the other end of which is threaded to receive a nut 111. One part of this split bushing 110 is formed with an inwardly-projecting stud 112 and the crank-shaft $j$ is formed with a hole 113 to receive this stud, whereby the bushing 110 is readily and accurately positioned upon the crank-shaft $j$. The ball-bearing $i$ comprises a pair of rings 114, 115 between which are mounted the balls 116; and this ball-bearing $i$ is held in place by the flanged head 117 of the bushing 110 and the nut 111 on the other end thereof. The ball-bearing $i$ is interposed between the split-bushing 110 and a two-part strap the upper part 118 of which is formed integral with the lower end of the connecting rod $h$ and the lower part 119 of which is bolted to the upper part, as is clearly shown in Figs. 2 and 5. This construction permits a speedy and accurate coupling of the connecting-rods $h$ to the crank-shaft and the use of standard ball-bearings of a uniform diameter.

To the spur-gear 68 which carries the governor-weights 69 there is pivotally fastened the upper end of a pitman 120 the lower end of which is pivotally fastened at 121 to the beam or rocker-arm 86 one end of which is rigidly fastened to a rock-shaft 122 journaled in the engine-casing and the other end of which is pivotally fastened to the outer end of the piston-rod 84 of the auxiliary high-pressure air-pump 81 hereinbefore described (Figs. 2, 4, 8, 9, 11 and 12). The rock-shaft 122 carries a second rocker-arm 123 formed in its free end with a socket 124 adapted to receive the headed end 126 of an interlocking slide-rod 125 which is mounted in lugs 127 formed upon the pump-lever 5 and by means of which the latter may be manually operated in the following manner: One end of the pump-lever 5 is loosely pivoted upon the rock-shaft 122 but normally turns with the same and with the rocker-arm 123 with which it is interlocked by the slide-rod 125. Between one of the lugs 127 on the pump-lever 5 and the head 126 of the slide-rod 125 there is mounted upon the latter a helical spring 128 which tends to keep the slide-rod 125 in interlocking engagement with the rocker-arm 123 (Figs. 9 and 11). When it is desired to operate manually the pump-lever 5 (as, for example, in starting the engine), the head 126 of the slide-rod 125 is against the tension of the coil-spring 128 withdrawn from interlocking engagement with the wall of the socket 124 in the rocker-arm 123 and the slide-rod 125 is then used as a handle by means of which to oscillate the pump-lever 5 upon its fulcrum, the rock-shaft 122. The three pump-plungers 2', 3', 4' are all connected with the pump-lever 5 in the same manner and it will therefore be sufficient to describe this connection with respect to one of the plungers, as that (4') of the water-pump 4 (Figs. 9 and 10). The outer end of the plunger is forked and is provided with a roller 129 which is mounted in a recess 5' formed in the pump-lever 5 and is held therein by means of a retaining-plate 5".

For economy of construction and to reduce as far as possible the heat losses, the engine casing 25 is made in a single casting in which are formed the power cylinders $a$, $b$, the cylinder of the air-compressor $k$, the valve-chambers $y$ of the power cylinders, the valve-chamber $x''$ of the throttle-valve, the exhaust-chamber 23 into which flow the waste gases from the power cylinders, the upper part of the steam-generator $u$ and the passage $w$ leading from the latter to the valve-chamber $x''$ of the throttle-valve $x$. Thus, in order to make the path of the working fluid as short and direct as possible and thereby avoid heat losses, the outlet portion of the steam-generator $u$ is arranged within the engine casing 25 and in close proximity to the power cylinders $a$, $b$, (Figs. 5, 6 and 7). The working fluid flows from the steam-generator chamber into a passage $w$ which lies between the power cylinders $a$, $b$ and the walls of which are in part formed by the walls of the latter, from which it follows that at least a part of the heat given up by the working fluid in passing from the steam-generator $u$ to the valve-chamber $x''$ of the controlling throttle-valve $x$ will perform the useful purpose of keeping the power cylinders $a$, $b$ warm and preventing thereby condensation of the steam upon admission of the working fluid thereto (Figs. 5, 6 and 7). Between the steam-generator $u$ and the passage $w$ there is interposed a grating 130 by which foreign matter is screened from out of the working fluid and is thereby prevented access to the engine parts. The walls at the lower end of the steam-generator are inclined inwardly and downwardly so as to leave a space 131 surrounding this lower reduced end for the flow of the products of combustion issuing from the combustion chamber $n$; that is, the chain is held away and prevented from filling entirely the space at the lower end of the steam-generator, and thus undue throttling of the gases at that point is obviated. It is to be observed that the lower end of the steam-generator $u$ is connected with the lower end of the combustion-chamber $n$.

In order to secure the highest efficiency of the apparatus as a whole and with this in view to prevent the discharge of the waste gases at an unduly high pressure, the combined volume of the power cylinders is made to bear a certain proportion to the volume of the air-compressor cylinder. A desirable proportion found is that obtained by making the combined effective volume of the two power cylinders equal to one and one-half times the effective volume of the air-compressor cylinder.

The operation of the apparatus will be readily understood from the foregoing description taken in connection with the accompanying drawings and may be set forth briefly as follows: The engine being at rest and it being assumed that the supply of fuel or of water (or of both) is too low, the operator disengages the slide-rod 125 from the rocker-arm 123 by pulling the same toward the left in Fig. 9 against the tension of the coil-spring 128 and he then uses the slide-rod 125 as a handle by means of which to swing or oscillate the recessed pump-lever 5. In this way he operates manually the three pumps simultaneously,—the two oil-controlling pumps 2, 3 and the water-pump 4. After he has in this way pumped a sufficient supply of oil and water into the apparatus for starting purposes, the crank-shaft $j$ is manually turned, the operator using a suitable cranking device for this purpose; or he may press down the knob 96 and thereby open the valve $97^x$ in the by-pass pipe 97 (Fig. 13) leading from the high-pressure air-tank, from which air at high pressure will flow into the power cylinders $a$, $b$ and will start the engine, the throttle valve $x$ being thrown open to permit the passage of the working fluid to the valve-cylinders $y$. As the crank-shaft $j$ turns, the air-compressor $h$ will force air under pressure into the compressed-air main 37 and thence through the branch-pipe 40 and past the air-screen 40′ into the air-passage 41 and the annular air-chamber 42 which surrounds the spraying-nozzle $q$. From the chamber 42 the air flows through the air-passage 43 to the air-outlet of the spraying-nozzle $q$ and through the air-passage 44 to the oil-well $t$, from which the pressure of the air forces the oil through the oil-passage 46 into the chamber 45 of the nozzle $q$. The combustible mixture of air and fuel issuing from the latter is inflamed by the electric igniter or sparker 52. Air from the compressed-air main 37 forces open the loaded valve 38 against the tension of the spring 38′ and flows through the passage 39 to the annular air-chamber $r$ and thence through the air-passages or air-holes $s$ into the space surrounding the annular flange 51 which safeguards against the premature commingling of the jet issuing from the spraying-nozzle $q$ with the air issuing from the air-holes $s$. By means of an air-deflecting ring 53, the air just mentioned is at an appropriate point directed inwardly toward the combustible mixture flowing from the spraying-nozzle $q$ and commingles with that mixture, with the result that perfect or complete combustion is attained. The stream of combustion products flows toward the rear of the combustion chamber $n$ and is impregnated with steam and water in the following manner: Water flows from the water-pump 4 through the annular water-jacket 17 in the oil-atomizing apparatus $p$ to the water-jackets 19, 20 in the air-compressor cylinder-ends and thence through the preheating-coil 26 in the exhaust-chamber 23 to the water-jacket $o$ surrounding the combustion-chamber $n$. The last-named water-jacket being full and water being substantially incompressible, every inward stroke of the water-pump plunger 4′ will force a jet of water from the water-jacket $o$ past the valve 29 and against the tension of the spring 30 thereof into the combustion chamber $n$ at the outlet end thereof, where the water (part of which will be transformed into steam) will meet and mix with the combustion products the heat of which will serve to gasify the steam and convert the water into steam. It is to be observed that the lowest point of the combustion chamber n meets the lowest point of the steam-generator u; and the stream of combustion products flows into the latter through the interstices between the small bits v (such as the links of a metal chain) and through the space 131 at the reduced lower end of the steam-generator, carrying with them as entrained moisture some of the water from the pool in the trap 33. The extensive surface of the chain-links v serves as a heating surface or medium of heat interchange or transfer by means of which the entrained moisture will be converted into steam, which may even become superheated. The working fluid flows from the upper part of the steam-generator u (Figs. 5, 6 and 7) through the screen 130 into the passage w and the valve-chamber x'' of the throttle valve x and then past the latter into the valve-chambers y of the power-cylinders a, b into which it is admitted through the inlet-ports 99 controlled by the piston-valves 98. The amount of working fluid admitted to the power-cylinders a, b will be regulated by the position of the throttle valve x; and, as has hereinbefore been explained, this position may be changed without causing an undue opening of the fuel-controlling valve 48, this result being accomplished by the provision of the slot 61 in the connection 60. Automatic regulation is accomplished by the governor mechanism 68, 69 and the connected parts; but the fuel-controlling valve 48 may be closed independently of the governor mechanism by closing the throttle valve x. By shifting the lever 109 the point of cut-off may be varied or the engine entirely reversed through the modified form of Joy valve-motion hereinbefore described. The cranks of the power cylinders are so set with relation to each other as to avoid a so-called "dead" point and the crank of the air-compressor k is so positioned with respect to the cranks of the power cylinders that the apparatus is balanced; and in order to reduce torsional stresses on the crank-shaft, the power cylinders are placed between the driving-wheel 66 and the air-compressor k. As the crank-shaft turns, the pump-actuating rocker-beam 86 is through the governor-wheel 68 driven and made to reciprocate the pump-plungers 2', 3' and 4' as hereinbefore explained in detail. The movement of the rocker-beam 86 causes the reciprocation of the piston-follower 82 of the auxiliary high-pressure air-pump the cylinder 81 of which is in communication with the high-pressure air-tank (not shown) into which air by two-stage compression is forced and from which air at high pressure may by pressing the knob 96 be allowed to flow past the valve 97× and through the air-return pipe 93, the by-pass 97 and the air-pipe 89 to the power-cylinders a, b to drive the apparatus at starting or in an emergency in which there is a demand for an abnormal amount of power for a short time.

In accordance with the provisions of the patent statutes, I have described the principle of operation of this invention, together with the apparatus which I now consider to represent the best embodiment thereof; but I desire to have it distinctly understood that the apparatus shown and described is only representative and that the invention can be carried out by other means.

I claim:

1. An apparatus of the character described, including water-feeding means; a fuel-spraying device; and a water-jacket which is arranged to cool said device and is connected with said means.

2. An apparatus of the character described, including water-feeding means; a fuel-spraying device; a water-jacket which is arranged to cool said device and is connected with said means; and a combustion chamber provided with a water-jacket; said water-jackets being distinct from each other.

3. An apparatus of the character described, including water-feeding means; a fuel-spraying device; a water-jacket which is arranged to cool said device and is connected with said means; an air-compressor provided with water-chambers connected with said water-jacket; and a combustion chamber provided with a water-jacket connected with said water-chambers; the latter being interposed between said water-jackets.

4. An apparatus of the character described, including an engine; an exhaust chamber through which flow waste gases from said engine; a combustion chamber provided with a water-jacket; water-feeding means; and water-preheating means arranged in said exhaust chamber and interposed between but connected with said water-jacket and water-feeding means.

5. An apparatus of the character described, including a combustion chamber provided with a water-jacket from which aqueous fluid is fed to said apparatus; water-feeding means connected with said water-jacket; and means for preventing ebullition in said water-jacket.

6. An apparatus of the character described, including a combustion chamber provided with a water-jacket from which aqueous fluid is fed to said apparatus; water-feeding means connected with said water-jacket; and means which controls communication between said water-jacket and apparatus and prevent ebullition in said water-jacket.

7. An apparatus of the character described, including a combustion chamber; means for feeding aqueous fluid thereto; and a steam-generator; said combustion chamber being inclined downwardly and toward said steam-generator.

8. An apparatus of the character described, including a combustion chamber; means for feeding aqueous fluid thereto; and a steam generator; the lower ends of said combustion chamber and steam generator being opposed to each other.

9. An apparatus of the character described, including a substantially horizontally-disposed combustion chamber; means for feeding aqueous fluid thereto; and a vertically-disposed steam-generator; said combustion chamber being inclined downwardly toward the steam-generator and having its lower end opposed to the lower end of the latter.

10. An apparatus of the character described, including a fuel-spraying nozzle formed with an air-passage; and a well for the fuel having an air-passage leading thereto; said air-passages being in line with each other whereby they may be readily cleaned.

11. An apparatus of the character described, including a fuel-spraying nozzle; a furnace in communication therewith; air-feeding means for feeding air to said furnace for the complete combustion of the fuel issuing from said nozzle; and means for controlling the point of mixture of the air with the jet issuing from the latter.

12. An apparatus of the character described, including a fuel-spraying nozzle; a furnace in communication therewith; air-feeding means for feeding air to said furnace for the complete combustion of the fuel issuing from said nozzle; and a wall which is interposed between the outlet of the latter and the outlet of said fuel-feeding means and which controls the point of mixture of the air with the jet issuing from said nozzle.

13. An apparatus of the character described, including a fuel-spraying nozzle; a furnace in communication therewith; air-feeding means for feeding air to said furnace for the complete combustion of the fuel issuing from said nozzle; and means for directing the air into the jet issuing from the latter.

14. An apparatus of the character described, including a fuel-spraying nozzle; a furnace in communication therewith; air-feeding means for feeding air to said furnace for the complete combustion of the fuel issuing from said nozzle; means for controlling the point of mixture of the air with the jet issuing from the latter; and a device mounted beyond the last-named means for directing the air toward said jet.

15. An apparatus of the character described, including a fuel-spraying nozzle; a furnace in communication therewith; means for feeding air under pressure to said nozzle; a conduit leading from said means to said furnace for feeding air thereto for the complete combustion of the fuel issuing from said nozzle; and means mounted in said conduit between said furnace and nozzle for resisting the passage of air to said furnace.

16. An apparatus of the character described, including fuel-feeding means; a valve controlling the amount of fuel fed thereby; an indicating spring arm attached to said valve; and mechanism connected to said arm for moving the latter.

17. An apparatus of the character described, including a fuel-spraying device; means for leading fuel and air thereto; a casing in which said device is mounted and which is formed with an air-chamber and with means for preventing the premature commingling of the air therefrom with the spray issuing from said device.

18. An apparatus of the character described, including a fuel-spraying device; means for feeding air under pressure thereto; a furnace into which said device discharges; a casing in which said device is mounted and which is formed with an air-chamber from which air flows into said furnace independently of said device; and a regulating device which maintains automatically the difference of pressure between the back-pressure in said furnace and the pressure acting to force the spray from said fuel-spraying device thereinto.

19. An apparatus of the character described, including a furnace formed with a combustion chamber and with a water-jacket surrounding the same; means for preventing ebullition in said water-jacket; a fuel-spraying device which discharges fuel into said combustion chamber; means for forcing air under pressure into said combustion chamber to support the combustion of the spray from said device; and a regulating device which automatically maintains the difference of pressure between the back-pressure in said furnace and the pressure acting to force the spray from said fuel-spraying device thereinto.

Signed at the borough of Manhattan, city, county and State of New York, this seventh day of July, 1913, in the presence of the two undersigned witnesses.

OTTO KRAUS.

Witnesses:
M. E. WOARDELL,
JAMES HAMILTON.